United States Patent
Piechocki

(10) Patent No.: US 9,260,903 B1
(45) Date of Patent: Feb. 16, 2016

(54) HIGH RESOLUTION MOTOR SPEED FOR CLOSED-LOOP SPEED CONTROL

(71) Applicant: Continental Automotive Systems, Inc., Auburn Hills, MI (US)

(72) Inventor: Christopher Piechocki, Livonia, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/535,504

(22) Filed: Nov. 7, 2014

(51) Int. Cl.
*H02P 7/06* (2006.01)
*B60J 1/17* (2006.01)
*E05F 15/697* (2015.01)

(52) U.S. Cl.
CPC ............. *E05F 15/697* (2015.01); *B60J 1/17* (2013.01); *H02P 7/06* (2013.01)

(58) Field of Classification Search
CPC ............. H02P 7/06; H02P 5/00; B60J 1/17; E05F 15/697

USPC ............. 701/49, 36; 318/268, 254, 138, 439
See application file for complete search history.

(56) References Cited

U.S. PATENT DOCUMENTS

| 6,144,179 | A | 11/2000 | Kessler et al. | |
|---|---|---|---|---|
| 6,986,688 | B1* | 1/2006 | Jansen | B63H 20/007 440/1 |
| 2003/0222614 | A1* | 12/2003 | Whinnery et al. | G05B 19/232 318/461 |
| 2004/0020700 | A1* | 2/2004 | Watson et al. | B60K 17/342 180/247 |

\* cited by examiner

*Primary Examiner* — Tan Q Nguyen

(57) ABSTRACT

Measuring a D.C. motor's armature voltage and current and measuring its rotation speed using a Hall-effect sensor enable a particular motor's characteristic equation to be determined empirically. After the equation that models a motor is determined, rotation speed can be determined between Hall-effect sensor signals using real-time measurements of armature voltage and current, which are substituted back into the equation. Current and/or voltage can also be adjusted to increase, decrease or maintain rotation speed.

18 Claims, 7 Drawing Sheets

HIGH RESOLUTION MOTOR SPEED FOR CLOSED-LOOP SPEED CONTROL

BACKGROUND

The direct current (D.C.) motor is often called upon to do the really tough industrial jobs because of its flexibility and because it is easy to control. It can also provide its full rated output torque at start up, i.e., zero RPM, using no more than its rated current. In certain applications, however, its high starting torque can be problematic, such as when a D.C. motor is used to drive mechanical devices that do not stand up well to high starting torque. Precise speed control can also be difficult to achieve as the load on a D.C. motor changes.

U.S. Pat. No. 6,144,179 to Kessler et al. entitled "Method for Establishing the Rotational Speed of Mechanically Commutated D.C. Motors" discloses a method and apparatus for providing precise speed control using commutation ripple. For various reasons, however, the commutation ripple of some D.C. motors is not detectable, rendering the method and apparatus disclosed in the patent unhelpful. A method and apparatus for providing precise control of a D.C. motor rotation speed when commutation ripple is too weak or undetectable would be an improvement over the prior art.

DETAILED DESCRIPTION

As used herein, the term, "real time" refers to the actual time during which something takes place. "Ripple" is a slight change in a voltage or current.

Figure 1:
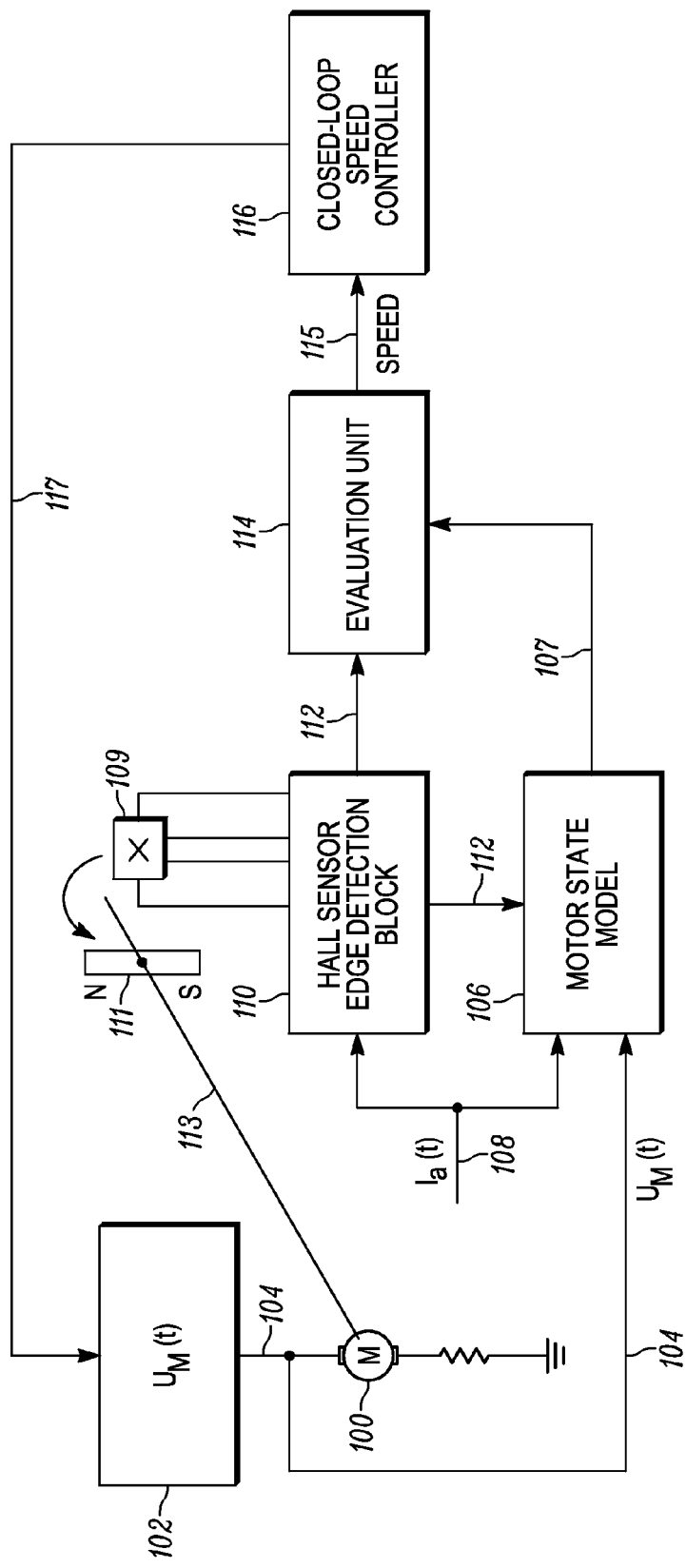
FIG. 1 depicts a method and functional components to provide high resolution motor speed control for a D.C. motor.

In FIG. 1 depicts a method, as well as functional elements of an apparatus, for precisely controlling the speed of a direct current (D.C.) motor 100, the armature 113 of which is provided power by an output-adjustable power supply 102 coupled to a processor 116. The processor 116 adjusts the electric energy provided to the motor 100 by the power supply 102 responsive to armature rotation speed.

Two armature rotation speeds are determined but only one of them is selected for use by the processor 116 to adjust power provided to the motor 100. A first armature rotation speed is determined by a motor state model 106, which is a well-known equation, identified by reference numeral 200 in FIG. 2, which models a D.C. motor. A second and actual armature rotation speed is determined using a Hall-effect sensor. The second, Hall-effect sensor-determined rotation speed is selectively used to determine parameters c(t) and R in the equation 200 and thus "update" the equation in real time. Under certain circumstances, however, the Hall-effect measured speed is used instead of the equation-determined speed.

Figures 2, 3:
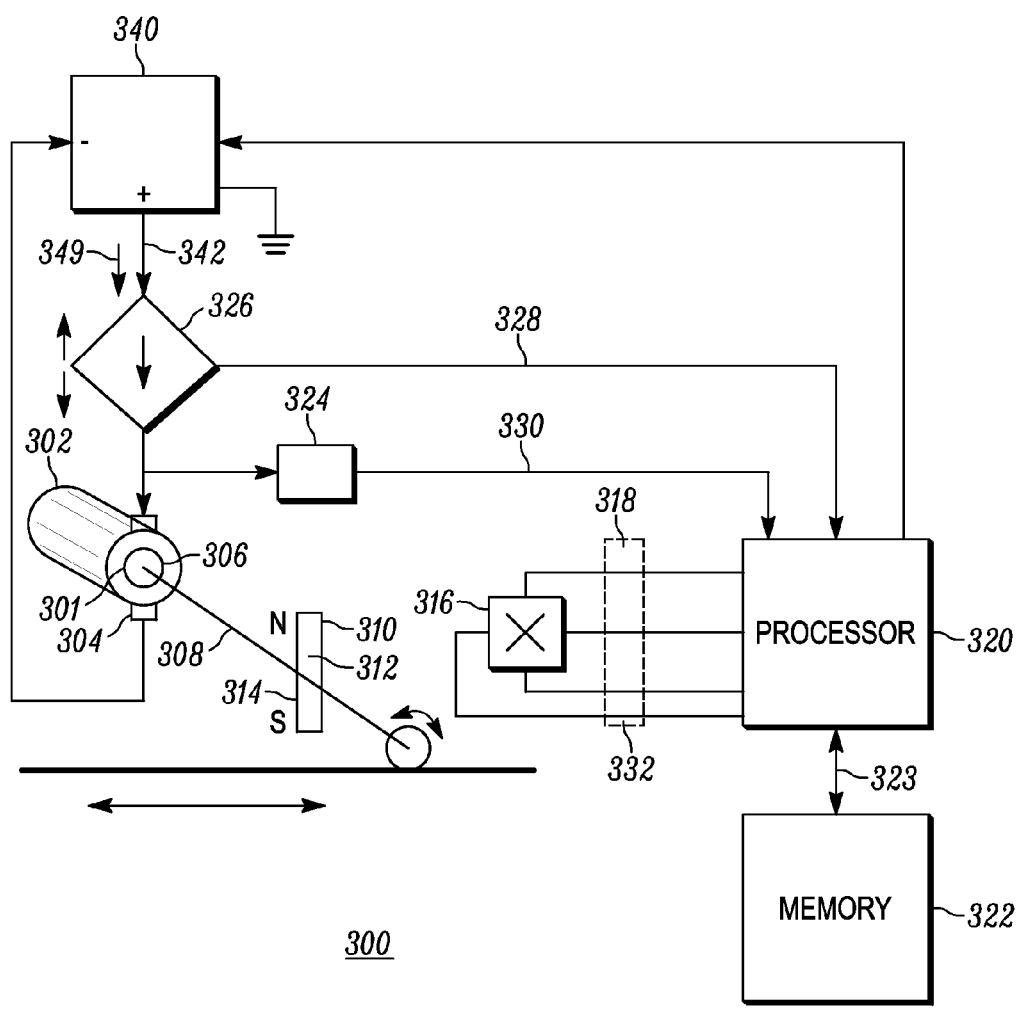
FIG. 2 shows a prior art equation, which models a D.C. motor.
FIG. 3 depicts an apparatus for controlling rotation speed of a direct current motor armature.

In the equation 200 shown in FIG. 2, R represents both electrical and mechanical losses of a motor; c(t) is a motor characteristic and which is unique to each motor; $U_m(t)$ is the motor's armature voltage; $I_a(t)$ is armature current and $$\frac{\partial I_a(t)}{\partial t}$$

represents changes in armature current over time. N(t) is the armature rotation speed. The calculation of armature rotation speed, n(t), using the equation in FIG. 2 is thus straightforward if the terms, c(t), $U_m(t)$, $I_a(t)$, R, L and $$\frac{\partial I_a(t)}{\partial t}$$

are known

When a motor 100 to be controlled is first started, i.e., run for the first time, the armature rotation speed, n(t), is calculated with the motor modeling equation 200 by measuring armature voltage and current and using default values for c(t) and $$\frac{\partial I_a(t)}{\partial t}$$

is ignored because $$\frac{\partial I_a(t)}{\partial t}$$

is typically small

A known problem with using the equation shown in FIG. 2 to determine rotation speed is that, c(t), R and L vary between motors. They also vary with rotation speed and load. Default values of those terms are also rarely accurate.

In order to overcome the shortcomings of the prior art motor modeling equation 200 and provide a high-resolution motor speed control, the second armature rotation speed is determined using a Hall-effect sensor 109, well-known to those of ordinary skill in the electronics art, which is fixedly attached relative to the motor. It is configured to detect a rotating magnetic field provided by a magnet 111 that is attached to the armature 113 of the motor.

In FIG. 1, the Hall-effect sensor 109 provides at least one output voltage pulse each time a magnet 111 rotates by the sensor 109. In other embodiments, a ring magnet, which is a well-known device having multiple pole pairs, is used to provide multiple pulses from the Hall-effect sensor 109 on each rotation of the armature 113.

Pulses from the Hall-effect sensor 109 correspond to full rotations of the armature 113. Those pulses are input to a Hall-effect sensor edge detector 110. The time, t, between each pulse from the Hall-effect sensor 109 thus corresponds directly to the rotation speed, s, of the armature 113 according to the relationship s=1/t. The Hall-effect sensor 109, edge detector 110 and magnet 111 attached to the armature 113 thus provide a direct measurement of the actual albeit average rotation speed of the armature 113, which is determined by the time that passes between two or more successive pulses output from the sensor 109. A problem with a Hall-effect sensor-measured rotation speed, however, is that armature rotation speed can change quickly, i.e., between Hall-effect sensor pulses.

In FIG. 1, the Hall-effect sensor edge detector 110 provides measured rotation speeds 112 to the motor state model 106. The motor state model 106 also receives measurements of armature voltage 104 and current 108. The measured rotation speeds 112 and measured voltages 104 and currents 108 are used to update the motor model equation 200. Stated another way, c(t) and R of the motor modeling equation 200 are determined empirically and updated periodically in real time in order to provide a more accurate modeling equation 200, which can be used to determine armature rotation speed between signals from the sensor 109 or if the sensor 109 is inoperative.

In FIG. 1, the motor state model 106 provides as an output 107, a calculated estimate of the armature rotation speed. As the motor state model 106 is updated over time using measured values of the armature rotation speed 112, the accuracy of the model and hence the accuracy of the output 107, changes as well. While the motor state model 106 can theoretically determine armature rotation speed accurately at any instant of time using only the armature voltage 104 and current 108 in view of the fact that armature rotation speed can change continuously during a single rotation, the armature rotation speed 112 as determined by the Hall-effect sensor edge detector 110 will sometimes be more accurate than the calculated value output 107 from the motor state model 106. The method and apparatus depicted in FIG. 1 thus includes an evaluation unit 114, which selects either the motor speed 112 from the Hall-effect edge detector 110 or the output 107 from the motor state model 106 as a "true" motor speed 115 to provide to a close-loop motor speed controller 116. A control signal 117 that is output from the motor speed controller 116 and input to the power supply 102 adjusts one or both voltage and current provided to the motor 100 in order to control armature 113 rotation speed.

The motor state model 106 and evaluation unit 114 depicted in FIG. 1 are embodied as a processor, not shown in FIG. 1, which is coupled to a non-transitory memory device (not shown) that stores executable instructions for the processor. When those instructions are executed by the processor, they cause the processor to perform various operations depicted in FIG. 1 and described below. Those operations include evaluation of the prior art motor state model, identified by reference numeral 200 in FIG. 2, in real time and the determination or derivation of an update to the model 200 in real time, using measured armature voltage 104, current 108 and actual armature rotation speed as determined by the Hall-effect sensor 109 and the Hall-effect edge detector 110.

As can be seen in FIG. 2, and as stated above if c(t), R, armature voltage $U_M(t)$ and armature current, $I_a(t)$ are known, the rotation speed n(t) can be determined directly, assuming that the change in armature current, $\partial I_a(t)/\partial t$, is approximately zero. In other words, knowing the current flowing through the armature, the voltage across the armature and the motor characteristic c(t) and R enables the speed of the armature to be calculated in real time. In the preferred embodiment, c(t) and R are determined empirically and repeatedly, using multiple measurements of armature current, armature voltage, rotation speeds and least mean square (LMS) curve fitting or some other method of determining an equation of a line through data points, which are plotted ratios of current, voltage and measured rotation speeds.

Figure 4:
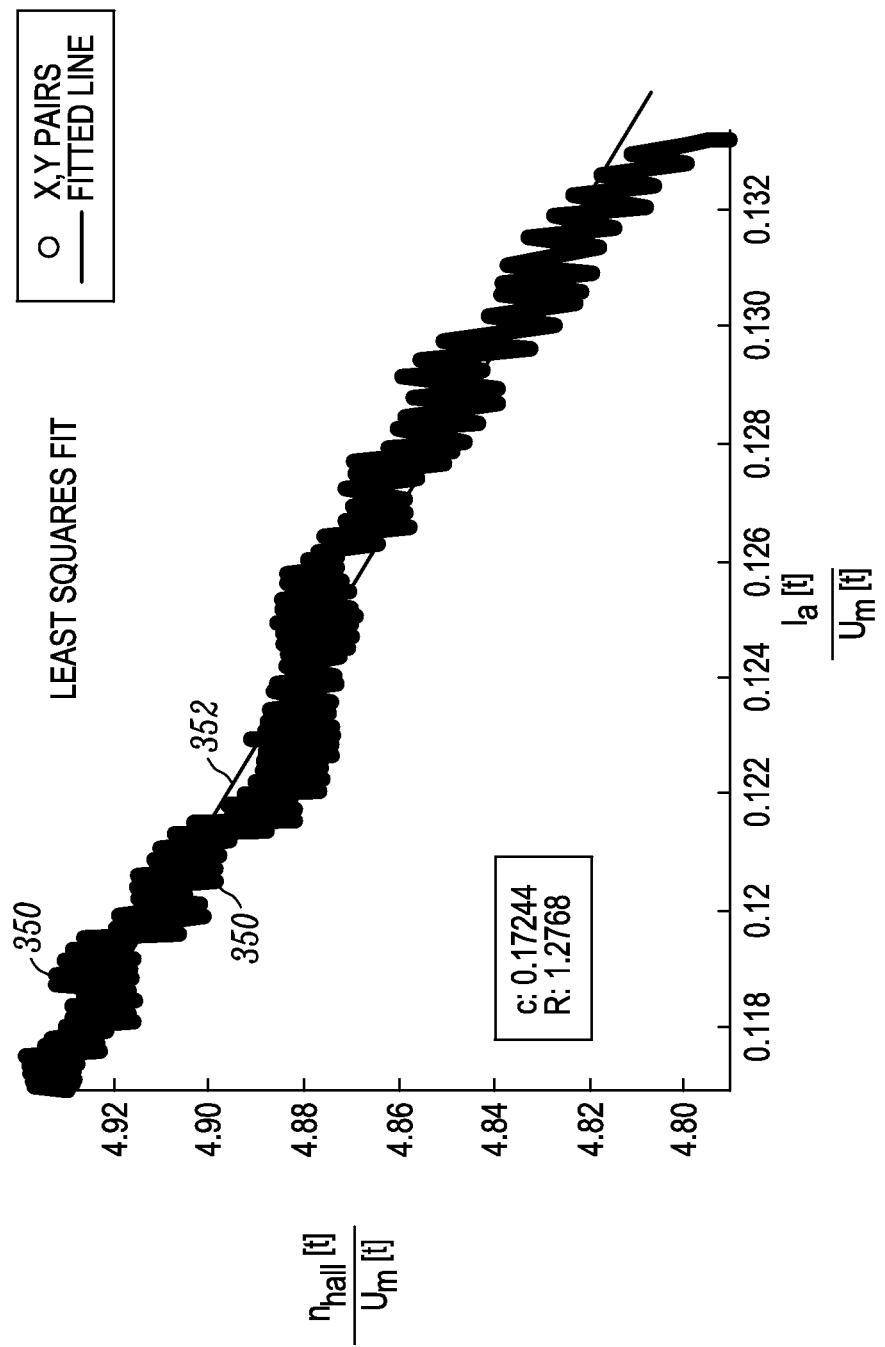
FIG. 4 depicts a plot of several data points each of which corresponds to a ratio of, actual rotation speed, n, divided by armature voltage to, armature current divided by armature voltage.

In FIG. 1, multiple measurements of armature current, armature voltage and the output 112 from a Hall-effect edge detector 110 and are provided to the motor state model 106, which is provided by a processor and a set of executable instructions. Stated another way, the motor state model 106 is provided with several consecutive voltage signals from the armature and corresponding consecutive current signals, i.e. current flowing through the armature, and consecutive armature rotation speed calculations from the Hall effect sensor 110. Ratios of those values, each of which is obtained in real time, are calculated and those calculated ratios are "plotted" as shown in FIG. 4.

An equation for the "plotted" values is derived by curve fitting. The derived equation is essentially an updated version of the equation 200 for a particular motor albeit one that is derived from empirical data. Stated another way, the equation that fits through "plotted" ratios of, the quotient of a Hall-effect signal to armature voltage, to the quotient of armature current to armature current, is an equation that models the motor's operation as a function of armature voltage and current. The derived equation thus provides c(t) and R in the motor modeling equation 200.

Those of ordinary skill in the art will recognize that, after an equation that models a motor is derived from measured values of speed, voltage and current, the derived equation can be subsequently used to calculate speed using only voltage and current. With respect the equation 200 shown in FIG. 2, the parameters c(t) and R of the motor state model 106 are derived using measured values of voltage 104, current 108 and rotation speed 112. The motor state model 106 is thus updated in real time using an LMS determination of c(t) and R.

In order to provide high-resolution motor speed control, the evaluation unit 114, which is also provided by a processor that executes instructions, "decides" whether to use the rotation speed as determined using the prior art motor model 106 or a speed 112 determined using Hall-effect sensor signals. The evaluation unit 114 selects a motor speed that is considered herein to be most accurate.

Those of ordinary skill in the art will recognize that armature speed measured by a Hall-effect sensor is not an instantaneous speed but is instead an average speed, i.e., the speed as determined by the elapsed time between two pulses. The accuracy of the Hall-effect sensor-determined speed will thus vary between pulses. At the precise time when the leading edge of a pulse from a Hall-effect sensor is detected, the time between it and the leading edge of a previous pulse and the correspondingly calculated rotation speed is considered herein to be more accurate than the rotation speed determined exclusively from an evaluation of the motor model 106. On the other hand, when the Hall-effect sensor signal 112 does not change over several armature revolutions, the armature rotation speed as determined by the prior art modeling equation 106 is likely more reliable and more accurate than the speed as indicated by signals form the Hall-effect sensor. As a final example, if the Hall-effect sensor signal is determined to be faulted, perhaps by hardware feedback, the motor model will be more reliable.

In FIG. 1, the armature speed 115 selected by the evaluation unit 114 is provided to a closed loop speed controller 116. The closed loop speed controller 116 provides an output signal 117 to the power supply 102 that adjusts either the voltage, the current or both voltage and current that is/are provided to the motor 100 responsive to an armature rotation speed, n(t) determined from either the equation shown in FIG.

2 or the armature speed rotation speed as determined by the Hall-effect sensor 109. The output 117 of the closed loop speed controller 116 to the power supply 102 can thus be considered a feedback signal, which can maintain, increase or decrease the speed of the motor 102.

FIG. 3 is a an apparatus 300 for controlling rotation speed of a conventional direct current (D.C.) motor 302 armature 301. The motor 302 has brushes 304 of course, which ride over a commutator 306. The brushes 304 and commutator 306 are configured, however, such that no measurable ripple in either the armature current or voltage exists. Stated another way, the motor is constructed such that, measuring rotation speed by measuring ripple in the voltage on the armature or armature current is not possible.

The armature 301 has an output shaft 308, depicted as being coupled to a magnet 310 the poles 312, 314 of which rotate past a conventional Hall-effect sensor 316. The Hall-effect sensor 316 provides an output, which is a voltage pulse, for each revolution of the magnet 310 and hence each revolution of the armature 301.

The output 318 of the Hall-effect sensor 316 is coupled to a processor 320. The processor 320 is coupled to a conventional non-transitory memory device 322 via a conventional bus 323. The memory device 322 stores executable program instructions and data for the processor 320. When those processor instructions are executed, they cause the processor to read an output from a voltage sensor 324, which is connected to the armature 301, obtain a signal from a current sensor 326, which measures current flowing through the armature 301, and determine armature rotation speed from the pulses output from the Hall-effect sensor 316.

As described above with regard to FIG. 1 and FIG. 2, the processor generates a mathematical model, i.e., an equation, representing the motor's characteristics, c(t) and R, using the measured current 328, measured voltage 330 and actual armature rotation speed as determined by the signals 332 from the Hall-effect sensor 316. After the c(t) and R for the motor 300 are calculated, the processor can thereafter calculate in real time, the rotation speeds of the armature, between Hall effect sensor signals, using the mathematical model that it generated from the collected data.

The processor 320 is coupled to an adjustable power supply 340 for the motor 302. Commands from the processor 320 to the power supply 340 cause the power supply 340 provide voltages and/or current to change responsive to changes in the determined armature rotation speed. The processor 320 is thus able to change the voltage and/or current provided to the motor 302 in real time, responsive to changes in a determined armature rotation speed.

As described above with regard to FIG. 1 and FIG. 2, the processor 320 generates a mathematical model for a particular D.C. motor by "plotting" several values of ratios of Hall-effect determined rotation speed, armature voltage at each speed, and armature current at each speed. FIG. 4 is an exemplary plot of such data points.

In FIG. 4, y-axis values are quotients of Hall-effect sensor-determined rotation speed n(t), and measured values of armature voltage at each measured speed. X-axis values are quotients of measurements of armature current at a particular measured speed, n, and the measured armature voltage at each measured speed.

After multiple data points 350 obtained by the processor 320 are "plotted," i.e. stored in a table or an array, the processor 320 generates an equation of a line 352 passing through the data points 350. A preferred method of generating an equation uses Least Mean Squared (LMS) curve fitting, which is a process well known to those of ordinary skill. Other methods of generating an equation that fits plotted data points are known but a description of them omitted in the interest of brevity. The equation of the line that best fits the "plotted" data points is subsequently used to calculate armature rotation speed in real time using the current and voltage provided to the armature, between Hall-effect sensor signals.

Figure 5:
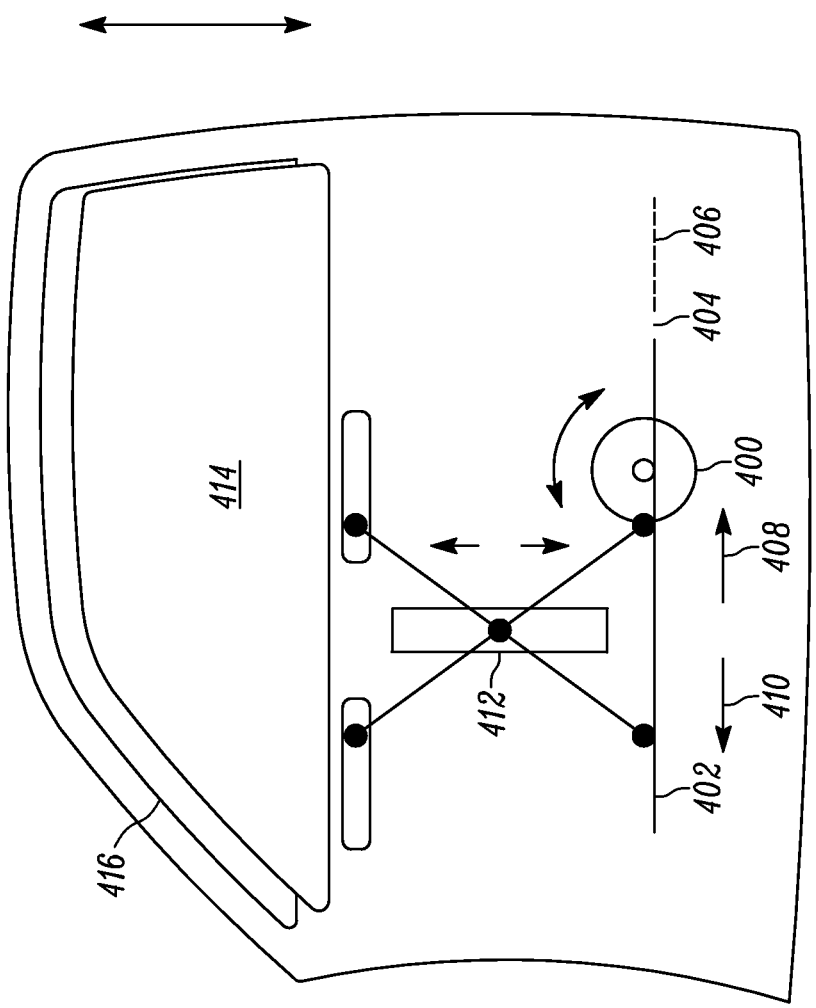
FIG. 5 depicts an application of the apparatus shown in FIG. 3, namely, as a drive for a power window in a motor vehicle.

The ability to calculate the armature's rotation speed between Hall-effect sensor signals using a derived equation enables a near-instantaneous adjustment of current and/or voltage in that, such adjustments are provided to the armature in real time in order to precisely control the armature rotation speed, even between successive Hall-effect signals. Stated another way, using only measured current and measured voltage and the derived equation, it is possible to calculate when an armature is slowing down or speeding up and calculate the speed or revolutions per minute (RPM) by which rotation speed changes. Calculating armature rotation speed and speed changes between Hall effect sensor samples and providing real-time compensation enables a high-precision, high-resolution speed control for D.C. motors. The practical benefits of such high resolution motor speed control are legion. FIG. 5 depicts one application of a D.C. motor having high resolution motor speed control.

In FIG. 5, the rotation speed of a D.C. motor 400 is controlled using the apparatus and method described above. The motor 400 is connected to a linear actuator 402, which translates between first and second positions 404, 406, responsive to changes in the direction of the D.C. motor. Stated another way, the linear actuator 402 can be made to translate in a first direction 408 when the motor 400 rotates in a first direction and translate in an opposite second direction 410 when the motor's rotation changes.

The linear actuator 402 is mechanically coupled to a window drive mechanism 412. The drive mechanism 412 cause a window 414 to go up and down between fully open and fully closed positions responsive to the translation of the linear actuator 402 between its first and second positions.

It is well known that the high starting torque and high running torque of a D.C. motor wears out components of a power window drive mechanism, such as the mechanism 412 depicted in FIG. 5. Slowing the D.C. motor when it starts and stops would significantly reduce the force absorbed by the mechanism 412 and correspondingly increase the number of cycles that the mechanism 412 could operate before failure. Precisely controlling the rotation speed of the motor 400 at the beginning and end of the window's upward and downward travel using the apparatus and method described above significantly extends the mechanism's lifespan.

Figure 6:
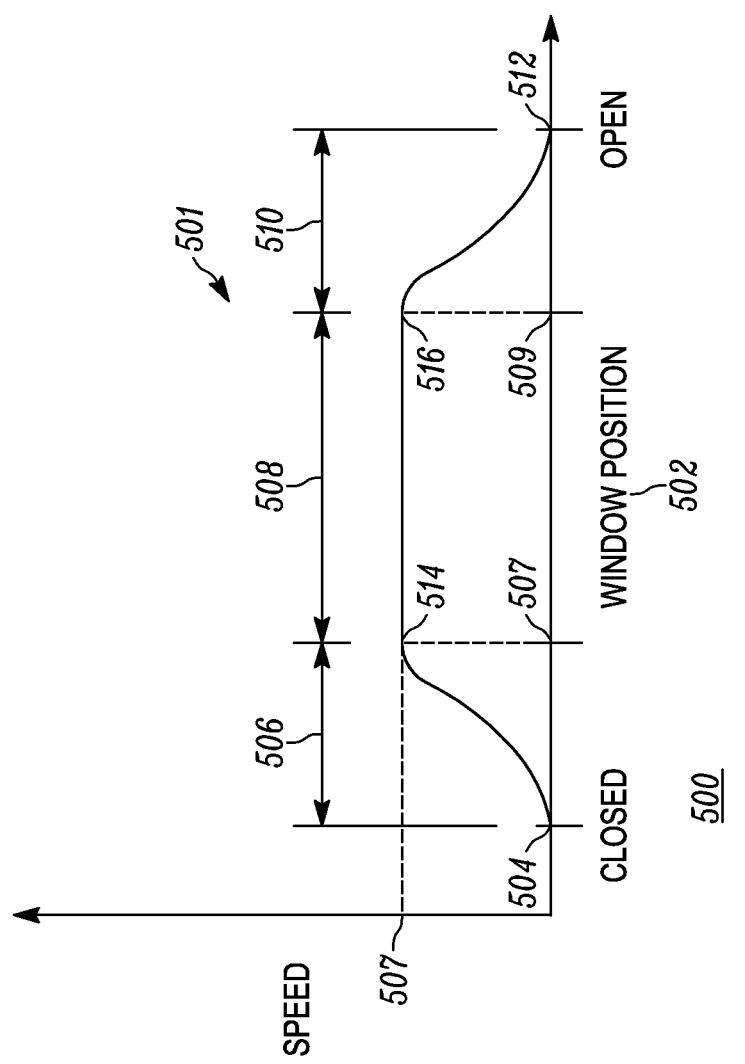
FIG. 6 is a graph of the motor speed as a function of window position.

FIG. 6 is a graph or plot 501 of the D.C. motor 400 rotational speed as a function of window 414 position using the high resolution motor speed control apparatus and method described above.

Starting from a window closed position 504, motor rotation speed gradually increases from zero during a non-linear phase 506 until the window reaches a first intermediate window position 507. Beyond the first intermediate position, the motor rotation speed is constant through a constant speed phase 508. As the window 414 travels away from the first intermediate position to a second intermediate window position 509, the motor speed is reduced gradually and non-linearly during second non-linear phase 510 until the window 414 reaches its fully open position 512. The motor speed thus has a non-linear characteristic that provides a slow or "soft" start as well as a slow or "soft" stop, significantly reducing wear on mechanical power window mechanism 412 components.

Those of ordinary skill in the art will recognize that the determination of the window position vis-à-vis its closed 504 and open positions 512 is readily determined by counting rotations of the D.C. motor armature. Program instructions in the memory of the device shown in FIG. 4 thus cause the processor to count the number of signals from the Hall-effect sensor and correlate them to armature rotations and window position.

Figure 7:
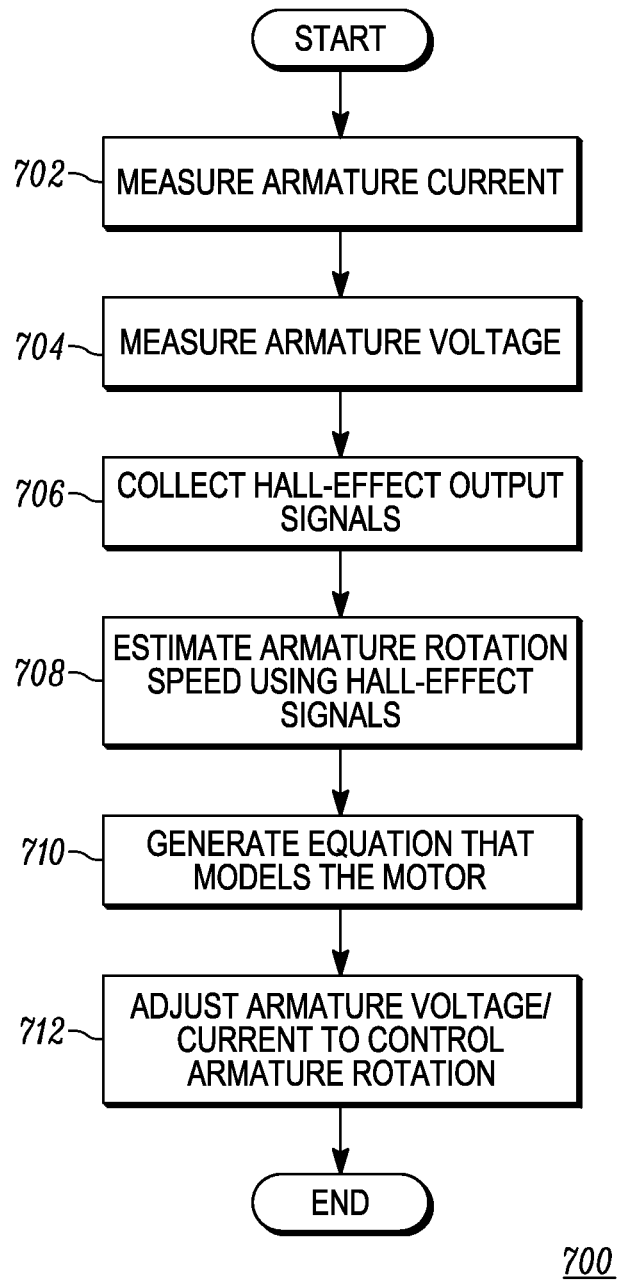
FIG. 7 depicts steps of a first method of controlling the rotation speed of a D.C. motor.

FIG. 7 depicts a method of controlling the speed of a direct current motor, the armature of which is coupled to an adjustable power supply, a voltage sensor and a current sensor and a Hall-effect sensor configured to detect the disruption of a magnetic field by the rotation of the armature. An example of such a structure is depicted in FIG. 3.

At a first step 702, armature current is measured followed by or contemporaneously with a measurement of the armature voltage 704. After the armature voltage and current are determined, at least two Hall-effect output signals are obtained 706 and the time between those two signals measured to provide an estimate of the armature's rotation speed 708. After the first four steps of the method depicted in FIG. 7 are repeated multiple times, accumulated data is used to generate an equation that closely models the shape of the plotted values. At step 710, an equation is generated using LMS. In the final step 712, the armature voltage and or current are adjusted to control armature rotation speed responsive to an armature speed that is calculated from the measured armature voltage and armature current. The voltage and current provided to the armature are thus controlled to maintain armature speed or change armature speed as desired.

Figure 8:
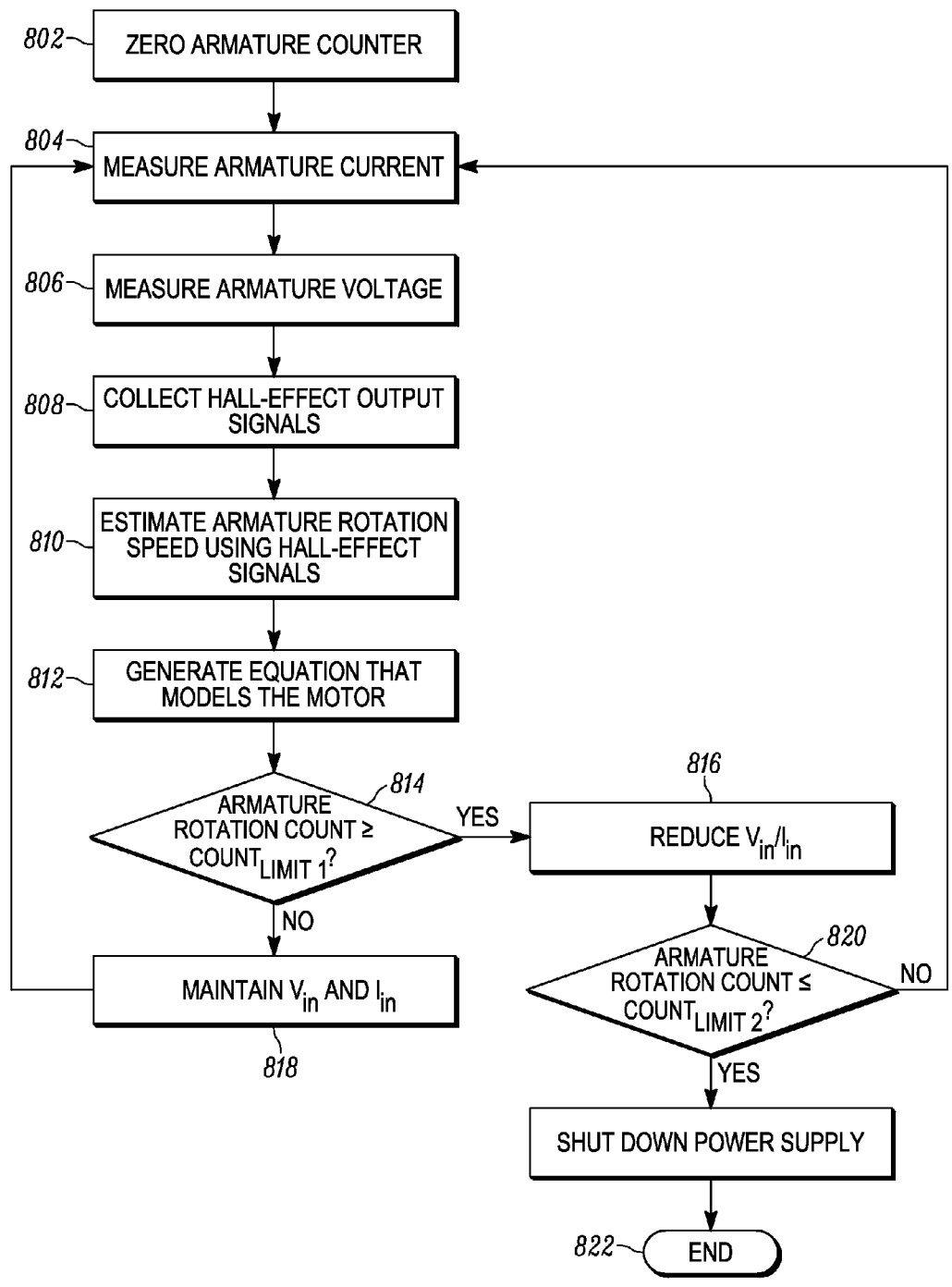
FIG. 8 depicts steps of a method for controlling D.C. motor speed in connection with the apparatus shown in FIG. 5.

Finally, FIG. 8 depicts a method of controlling armature rotation speed as a function of a linear actuator's position, such as the actuator shown in FIG. 5. As an initial step 802, a counter for Hall-effect sensor signals is initialized to zero. Steps 804-812 are the same as steps 702-708 shown in FIG. 7; description of them is therefore omitted for brevity.

At step 814, a count of armature rotations is incremented and the count tested against a pre-determined value or limit in order to determine where the linear actuator is located along its travel path. If the armature rotation count exceeds or is equal to a predetermined value, the method 800 considers the linear actuator to be at some location along its travel where the motor speed should be changed to accommodate a mechanical device being driven by the motor. In FIG. 8, the method reduces the input voltage and/or current to the motor in order to slow the motor- and reduce its output torque. The count is updated at step 820 and steps 804-814 are repeated.

Still referring to step 814, if the armature rotation count is less than the predetermined first limit, the voltage and/or current are maintained in order to run the D.C. motor at a relatively constant speed. Once the limit is exceeded, however, as determined at 820, a decision is made that the linear actuator is at the extent of its travel. The power supply is thus shut down at step 820 reducing or preventing damage to a mechanism such as a window drive mechanism.

Those of ordinary skill in the art will recognize that calculating armature rotation speed continuously in real time and adjusting the power provided to an armature in real time provides many operational advantages to a mechanism that is driven by a conventional D.C. motor. The foregoing description is for purposes of illustration only, however, the true scope of the invention being set forth in the following claims.

What is claimed is:

1. An apparatus for controlling the rotation speed of a direct-current motor armature, which is coupled to an adjustable power supply, the apparatus comprising:

a voltage sensor coupled to the armature and configured to provide a signal representing voltage across said armature;

a current sensor configured to provide a signal representing current flowing through said armature;

a Hall-effect sensor configured to detect rotation of the armature;

a processor coupled to the Hall-effect sensor, the voltage sensor and the current sensor;

a non-transitory memory device coupled to the processor and storing program instructions, which when executed cause the processor to:

determine current through the armature from the current sensor;

determine voltage across the armature from the voltage sensor;

obtain at least first and second output signals from the Hall-effect sensor;

determine an armature rotation speed estimate from at least one output signal from the Hall-effect sensor;

determine a mathematical model for the direct current motor from the current flowing through the armature, the voltage across the armature and the armature rotation speed estimate;

after the mathematical model is determined, calculate armature rotation speed between signals from the Hall-effect sensor using the mathematical model; and adjust at least one of the voltage and current provided to the armature by the power supply responsive to a armature rotation speed that is calculated using the mathematical model.

2. The apparatus of claim 1, wherein the non-transitory memory device stores additional program instructions comprising:

instructions that determine a mathematical model for the direct current motor by determining an equation for a line having a shape that is substantially the same as a graphical plot of a plurality of values of Hall-effect determined rotation speed, armature voltage at each determined rotation speed and armature current at each determined rotation speed.

3. The apparatus of claim 1, wherein the non-transitory memory device stores additional program instructions comprising:

instructions that adjust at least one of the voltage and current provided to the armature by the power supply responsive to a armature rotation speed that is determined from signals received from the Hall-effect sensor instead of determined using the mathematical model.

4. The apparatus of claim 1, wherein the program instructions further comprise instructions that cause the processor to:

obtain a plurality of signals representing voltage across the armature at different armature rotation speeds;

obtain a plurality of signals representing corresponding current through the armature at the different armature rotation speeds; and plot a relationship between armature rotation speeds, as determined from a plurality of Hall-effect sensor values, and the plurality of signals representing armature voltage, versus armature current and armature voltage.

5. The apparatus of claim 3, wherein the program instructions determine an equation for a line through the plot of the relationship.

6. The apparatus of claim 2, wherein the Hall-effect sensor provides an output signal at least once for each rotation of the armature and wherein calculating armature rotation speed between signals from the Hall-effect sensor occurs during one rotation of the armature.

7. The apparatus of claim 1, further comprising:
a memory device having program instructions which when executed cause the processor to control electric energy provided to the armature, between signals from the Hall-effect sensor, whereby armature rotation speed is maintained substantially constant between subsequent signals from the Hall-effect sensor.

8. The apparatus of claim 1, further comprising: a memory device having program instructions which when executed cause the processor to count signals from the Hall-effect sensor and control electric energy provided to the armature, between signals from the Hall-effect sensor responsive to a predetermined number of armature rotations.

9. The apparatus of claim 1, wherein the memory device further comprises additional program instructions, which when executed cause the processor to change an output voltage of the power supply between signals from the Hall-effect sensor, whereby armature rotation speed is varied between signals from the Hall-effect sensor by adjusting the output voltage responsive to a number of armature rotations.

10. The apparatus of claim 1, further comprising:
a linear actuator, which is coupled to the motor and moved between first and second positions responsive to a first number of armature rotations; and
wherein the memory device further comprises additional program instructions which when executed cause the processor to change an output voltage of the power supply between signals from the Hall-effect sensor, whereby armature rotation speed is varied between signals from the Hall-effect sensor by adjusting the output voltage responsive to a number of armature rotations.

11. A method for controlling the speed of a direct-current motor having an armature coupled to an adjustable power supply, a voltage sensor coupled to the armature and which is configured to provide a signal representing a voltage across said armature, a current sensor configured to provide a signal representing current flowing through said armature from the power supply, and a Hall-effect sensor configured to detect rotation of the armature by sensing a magnetic field's disruption caused by rotation of the armature, the method comprising:
determining current through the armature from the current sensor;
determining voltage across the armature from the voltage sensor;
obtaining at least first and second output signals from the Hall-effect sensor;
estimating armature rotation speed from the at least one output signal from the Hall-effect sensor;
generating a mathematical model for the motor from the current flowing through the armature, the voltage across the armature and the armature rotation speed estimate; and
after the mathematical model for the motor is generated, calculating armature rotation speed between signals from the Hall-effect sensor using the mathematical model; and
adjusting electric energy provided to the motor by the power supply responsive to a calculated armature rotation speed.

12. The method of claim 11, further comprising: adjusting electric energy provided to the motor by the power supply responsive to an armature speed that is determined from signals from the Hall-effect sensor, instead of a calculated armature rotation speed.

13. The method of claim 11, further comprising: determining an equation for a line having a shape, which is substantially the same as a graphical plot of a plurality of values of Hall-effect measured rotation speed, armature voltage and armature current.

14. The method of claim 11, further comprising;
obtaining a plurality of signals representing voltage across the armature at different armature rotation speeds;
obtaining a plurality of signals representing corresponding current through the armature at the different armature rotation speeds; and
plotting a relationship between armature rotation speeds, as determined from a plurality of Hall-effect sensor values, and the plurality of signals representing armature voltage, versus armature current and armature voltage.

15. The method of claim 11, further comprising: maintaining an armature rotation speed substantially constant between signals from the Hall-effect sensor by changing an output of the power supply between signals from the Hall-effect sensor.

16. The method of claim 11, further comprising changing armature rotation speed between signals from the Hall-effect sensor by changing an output of the power supply between signals from the Hall-effect sensor.

17. The method of claim 11, wherein the motor is coupled to a linear actuator and moved between first and second positions responsive to a first number of armature rotations, the method further comprising:
changing an output voltage of the power supply between signals from the Hall-effect sensor responsive to a number of armature rotations.

18. The method of claim 17, wherein the linear actuator is coupled to a window of a motor vehicle wherein the window is fully closed when the actuator is at the first position and the window is at least partially open when the actuator is at the second position, the method further comprising:
decelerating the armature rotation speed when the actuator travels past the second position toward the first position; and
shutting off the power supply when the actuator reaches the first position.

\* \* \* \* \*